(12) United States Patent
Matres et al.

(10) Patent No.: US 10,281,651 B2
(45) Date of Patent: May 7, 2019

(54) OPTICAL ZIG-ZAGS

(71) Applicant: HEWLETT PACKARD ENTERPRISE DEVELOPMENT LP, Houston, TX (US)

(72) Inventors: Joaquin Matres, Palo Alto, CA (US); Michael Renee Ty Tan, Palo Alto, CA (US); Sagi Mathai, Palo Alto, CA (US); Wayne Victor Sorin, Palo Alto, CA (US); Paul Kessler Rosenberg, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/555,733

(22) PCT Filed: Apr. 10, 2015

(86) PCT No.: PCT/US2015/025295
§ 371 (c)(1),
(2) Date: Sep. 5, 2017

(87) PCT Pub. No.: WO2016/164038
PCT Pub. Date: Oct. 13, 2016

(65) Prior Publication Data
US 2018/0052284 A1    Feb. 22, 2018

(51) Int. Cl.
*G02B 6/293*    (2006.01)
*G02B 1/11*    (2015.01)
(Continued)

(52) U.S. Cl.
CPC .......... *G02B 6/29367* (2013.01); *G02B 1/11* (2013.01); *G02B 6/2938* (2013.01); *G02B 6/124* (2013.01);
(Continued)

(58) Field of Classification Search
CPC .............. G02B 6/1225; G02B 6/29367; G02B 6/2938; G02B 6/4246; G02B 6/0065;
(Continued)

(56) References Cited

U.S. PATENT DOCUMENTS 4,244,045 A    1/1981 Nosu et al.
5,835,517 A *  11/1998 Jayaraman ......... G02B 6/29358
                                                              372/50.124
(Continued)

FOREIGN PATENT DOCUMENTS

CN    1359475 A    7/2002
CN    102890313 A  1/2013
(Continued)

OTHER PUBLICATIONS

International Search Report & Written Opinion received in PCT Application No. PCT/US2015/025295, dated Jan. 8, 2016, 11 pages.
(Continued)

*Primary Examiner* — Michael P Mooney
(74) *Attorney, Agent, or Firm* — Nolte International Propert Law Group

(57) ABSTRACT

An example device in accordance with an aspect of the present disclosure includes a slab to transmit light, and a plurality of lenses and filters disposed on first and second surfaces of the slab. The lenses include an anti-reflective coating on at least one of the plurality of lenses at an end of the slab to couple light through the anti-reflective coating, and a reflective coating disposed on remaining ones of the plurality of lenses to cause the lenses to reflect light. The filters are offset from the lenses to form an optical zig-zag.

19 Claims, 5 Drawing Sheets

(51) Int. Cl.
*G02B 6/42* (2006.01)
*G02B 6/124* (2006.01)
*G02B 6/122* (2006.01)

(52) U.S. Cl.
CPC .......... *G02B 6/1225* (2013.01); *G02B 6/4215* (2013.01); *G02B 6/4246* (2013.01)

(58) Field of Classification Search
CPC .... G02B 6/12007; G02B 6/124; G02B 6/136; G02B 6/4214; G02B 6/4215; G02B 6/4267; G02B 1/11
USPC .............................................. 385/24, 33, 47
See application file for complete search history.

(56) References Cited

U.S. PATENT DOCUMENTS

| | | | |
|---|---|---|---|
| 6,563,976 B1 | 5/2003 | Grann et al. | |
| 6,636,658 B2 | 10/2003 | Goodman et al. | |
| 6,769,816 B2 | 8/2004 | Capewell et al. | |
| 6,870,976 B2 | 3/2005 | Chen et al. | |
| 7,260,293 B1* | 8/2007 | Gunn, III | G02B 6/124 385/37 |
| 9,746,608 B1* | 8/2017 | Rabiei | G02B 6/124 |
| 2003/0138194 A1 | 7/2003 | Hwang et al. | |
| 2003/0142405 A1 | 7/2003 | Hoose et al. | |
| 2005/0254827 A1 | 11/2005 | Hopkins et al. | |
| 2006/0078252 A1 | 4/2006 | Panotopoulos | |
| 2009/0097847 A1 | 4/2009 | Hosomi et al. | |
| 2011/0033152 A1 | 2/2011 | Morris et al. | |
| 2013/0058370 A1* | 3/2013 | Chang-Hasnain | B82Y 20/00 372/50.11 |
| 2015/0010034 A1* | 1/2015 | Chang-Hasnain | H01S 5/18341 372/50.124 |
| 2015/0286006 A1* | 10/2015 | Chang-Hasnain | G02B 6/42 136/259 |

FOREIGN PATENT DOCUMENTS

| | | |
|---|---|---|
| TW | 201044042 A1 | 12/2010 |
| TW | 201443503 A | 11/2014 |

OTHER PUBLICATIONS

Kamei, S. et al., "Crosstalk Reduction in Arrayed-Waveguide Grating Multiplexer/Demultiplexer Using Cascade Connection," (Research Paper), Journal of Lightwave Technology 23.5, May 2005, pp. 1929-1938, available at http://ieeexplore.ieee.org/stamp/stamp.jsp?arnumber=1430792.

Taillaert, D., et al., "A Compact Two-Dimensional Grating Coupler Used as a Polarization Splitter," Photonics Technology Letters, IEEE 15.9, 2003, pp. 1249-1251.

\* cited by examiner

OPTICAL ZIG-ZAGS

BACKGROUND

Communication architectures may involve optical signals and interconnects to transmit signals between nodes. A multiplexer or demultiplexer may be used to split or combine signals. However, such components may be associated with costly materials and manufacturing steps, and be susceptible to temperature variations.

BRIEF DESCRIPTION OF THE DRAWINGS/FIGURES

DETAILED DESCRIPTION

Multiplexers and/or de-multiplexers have been formed using lossy structures (such as Echelle gratings) associated with drawbacks including a need for high fabrication tolerances, operational drifting along with temperature variations, a need for thermal tuning, and power waste.

In contrast, the examples described herein enable multiplexer and de-multiplexer approaches based on, e.g., zig-zag structures to combine or separate multiple wavelengths (e.g., colors). Such structures may take advantage of features such as thin-film filters and others, to minimize power usage, and achieve high isolation and insensitivity to polarization and temperature variations. Examples also may provide multi-dimensional integration, such as including a multiplexer and demultiplexer in a single device arranged in a two-dimensional array. Examples may take advantage of photonic integrated circuits, enabling small size, low cost, monolithically integrated devices.

Figure 1:
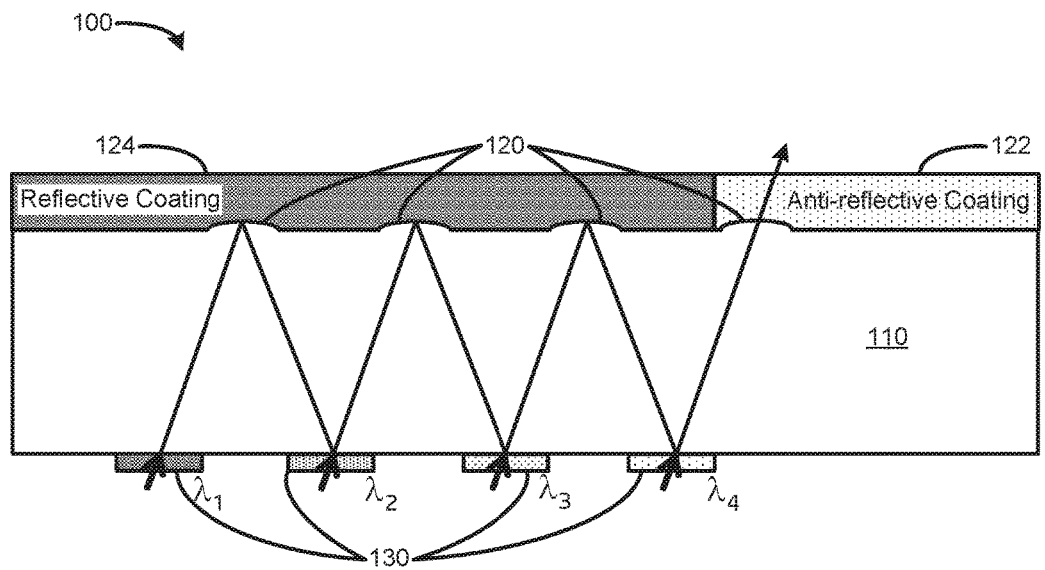
FIG. 1 is a block diagram of a device including a slab, a plurality of lenses, and a plurality of filters according to an example.

FIG. 1 is a block diagram of a device 100 including a slab 110, a plurality of lenses 120, and a plurality of filters 130 according to an example. Light is shown entering the plurality of filters 130, bouncing back and forth inside a cavity formed by the slab 110, and exiting through the anti-reflective coating 122. Thus, FIG. 1 depicts the device 100 being used to multiplex light received at the filters 130 and emitted at the anti-reflective coating 122. The lenses 120 are disposed on an upper first surface of the slab 110 to refocus the light (which otherwise may form a diverging beam in the slab 110 in need of focus by the lenses 120). A filter 130 may be associated with a desired wavelength, such as $\lambda 1, \lambda 2, \lambda 3, \ldots \lambda n$, such that the filter transmits the desired wavelength into the slab 110 (when used as a multiplexer), while reflecting other wavelengths. When used as a de-multiplexer, a filter allows the desired wavelength to exit the slab 110, while reflecting other wavelengths.

Although not specifically shown in FIG. 1, the light can be coupled into or out of the slab 110 using a waveguide and/or grating couplers, mirrors, or the like. For example, the slab 110 may be coupled or integrated with a waveguide layer disposed on the lower second surface of the slab 110, to couple light into or out of the slab 110. The light sources may be provided as silicon photonics coupled to the waveguide, and the slab 110 may be formed of a different material than the silicon photonics or waveguide, such as glass or plastic, to lower costs and improve temperature variation tolerances. In alternate examples, the slab 110 may be formed of silicon, SiO2 or other materials.

Accordingly, example devices may be manufactured based on silicon fabrication techniques, by integrating device features in silicon. Layers of the device, including layers formed of dissimilar materials, may be bonded together to form thicker layers (such as bonding two pieces of silicon together to form the slab 110). The slab 110 may be formed of materials such as silica, silicon, nitride, and other materials that may be grown in a reactor. Accordingly, example devices may take advantage of mass production fabrication to fabricate many devices to achieve lower production costs.

In an example device, fabrication techniques may be used to form the lenses 120 from the upper surface of the slab 110 based on etching away surrounding portions of an upper surface of the slab 110 to produce the convex lenses 120. In alternate examples, the lenses 120 may be formed separately and bonded to the upper surface of the slab 110. The lenses 120 are illustrated as convex-shaped portions of the slab 110, but in alternate examples (not shown), the lenses 120 may be formed as gratings or high contrast gratings, e.g., to couple and/or focus the light between the slab 110 and an input or output fiber. Although four lenses 120 are illustrated, in alternate examples, a greater or fewer number of lenses 120 may be used, e.g., an arbitrary number of n lenses 120 may be used (e.g., corresponding to a number of wavelengths $\lambda n$). The lenses 120 may be altered by coatings 122, 124.

The reflective coating 124 may be used to cause at least a portion of the lenses 120 to act as mirrors. The anti-reflective coating 122 may be used on at least one lens 120 at an end of the slab 110, to avoid causing reflection of the light leaving (or entering) the slab 110. The coatings may be grown to a desired thickness based on fabrication techniques.

The filters 130 represent a plurality of wavelengths $\lambda n$, and may correspond to colors such as red, yellow, green, blue, etc. (including non-visible wavelength ranges). A given filter can transmit its corresponding wavelength, and reflect other wavelengths. The filters 130 may be formed as thin film filters, mirrors, gratings, and/or other suitable components to selectively affect wavelengths of the light. The filters 130 are disposed on a second, bottom surface of the slab 110. In an example, the filters 130 may be formed by etching, e.g., etching the bottom surface of the slab 110 in examples where the slab 110 is formed of silicon or other materials compatible with etching. In alternate examples, the filters 130 may be formed by etching a separate layer (not shown in FIG. 1, such as a waveguide layer) that is disposed on the second surface of the slab 110 to dispose the filters 130 on the second surface of the slab 110.

Figure 2:
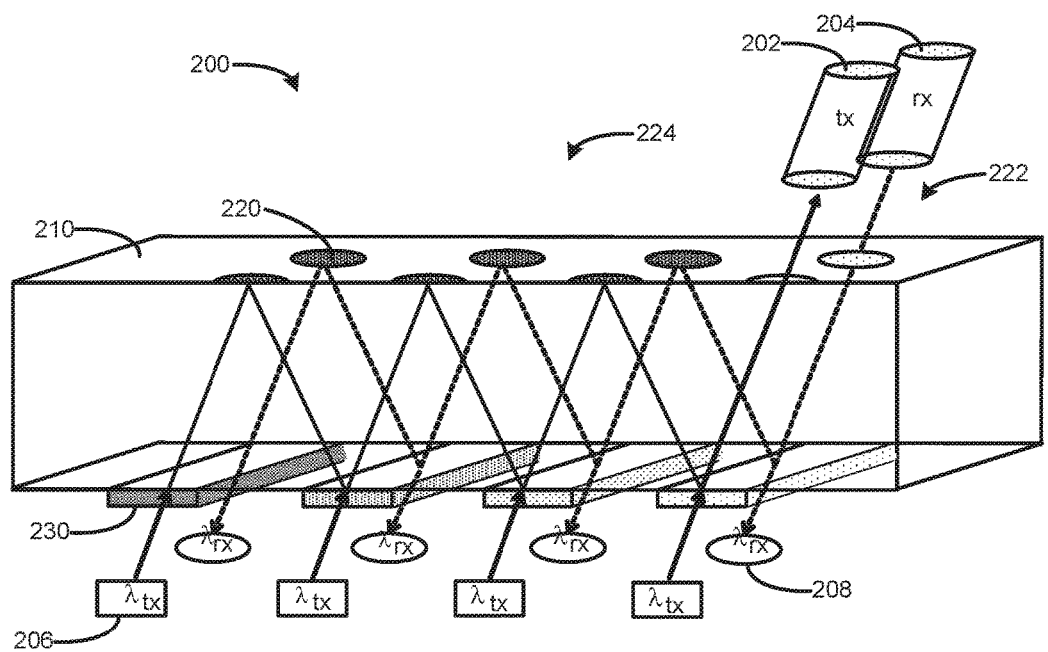
FIG. 2 is a block diagram of a device including a slab, a plurality of lenses, and a plurality of filters according to an example.

FIG. 2 is a block diagram of a device 200 including a slab 210, a plurality of lenses 220, and a plurality of filters 230 according to an example. Although depicted for simplicity as circles, the lenses 220 may be formed as a convex hemispherical shape, based on the side view of FIG. 1. The lenses 220 are disposed on a first surface of the slab 210 and have corresponding coatings (reflective/anti-reflective), to transmit and receive light from the transmit fiber 202 and receive fiber 204. The lenses 220 are arranged in a two-dimensional array, enabling slab 210 to both send and receive signals. The array may be extended beyond two dimensions and/or beyond the illustrated two rows and four lenses/filters. For example, the slab 210 may be extended length-wise to accommodate additional rows of filters/lenses, and extended width-wise to accommodate additional columns.

The plurality of filters 230 are disposed on a second surface of the slab 210. As illustrated, a given filter 230 spans a width of the slab 210 sufficient to interoperate with the two sets of lenses 220. A plurality of transmitters 206 are disposed beneath the slab 210 to transmit signals through the filters 230 into the slab 210. A plurality of receivers 208 are disposed beneath the slab 210 to receive signals through the filters 230 from the slab 210. Thus, the example device 200 may integrate an array of transmitters 206 and/or receivers 208, and share thin film filters 230 and the zig-zag cavity formed by the slab 210. The example device may be expanded to integrate multiple arrays of transmitters and/or receivers. FIG. 2 illustrates a two-dimensional array to integrate multiplexer and demultiplexer functionality via the transmitters 206 and receivers 208. In alternate examples, a device may integrate an array of a plurality of transmitters 206 without including receivers 208, and a device may integrate an array of a plurality of receivers 208 without including transmitters 206.

The transmitters 206 may be based on an array of lasers and modulators or other suitable components for transmitting signals to the slab 210 at corresponding wavelengths. The lasers/modulators may be compatible with fabrication of silicon or other materials. The transmitters 206 may be pre-aligned with the other components of the device 210, based on their alignments already being incorporated into lithographic fabrication steps, without a need to perform a separate/dedicated alignment between such components based on lithographic fabrication. The slab 210 also may be fabricated (e.g., a silicon slab 210) using lithographic fabrication. In alternate examples, the slab 210 may be made of glass, plastic, etc., which can be precisely aligned onto the pre-aligned fabricated (e.g., silicon substrate) portions using fiducials on both the slab 210 and the fabricated portions.

The receivers 208 may be based on photodetectors or other suitable components for receiving signals from the slab 210 at corresponding wavelengths. To process light signals from the receive fiber 204, the thin-film filters 230 selectively reflect light, to allow the particular wavelength associated with that filter 230 to pass through the filter 230, and reflect the other wavelengths. Beneath that given filter 230, a corresponding receiver 208 may be disposed, such as a waveguide photodetector coupled via a grating, or a surface illuminated photodetector fabricated on silicon, germanium, etc.

The filters 230 may be polarization independent, e.g., for small angles of incidence of the light. Polarization independency is useful for integrating with the demultiplexer as a receiver, because the light/signals from the receiving fiber 204 may have an unknown/random state of polarization, such as linear or circular state of polarization. Accordingly, the filters 230 may enable polarization insensitivity for the device 200.

The device 200 enables two-way bidirectional communication simultaneously, across the same slab 210, whether light is received or transmitted. The multi-dimensional nature of the device 200 enables, e.g., a row of lenses for transmitters 206, and a row of lenses for receivers 208. The device 200 may be extended arbitrarily, such as including multiple rows or columns to interface with a fiber array such as a 1×12 fiber array, a 1×16 fiber array, and beyond (e.g., supporting arbitrary sizes of arrays of n×m rows and columns).

Figure 3:
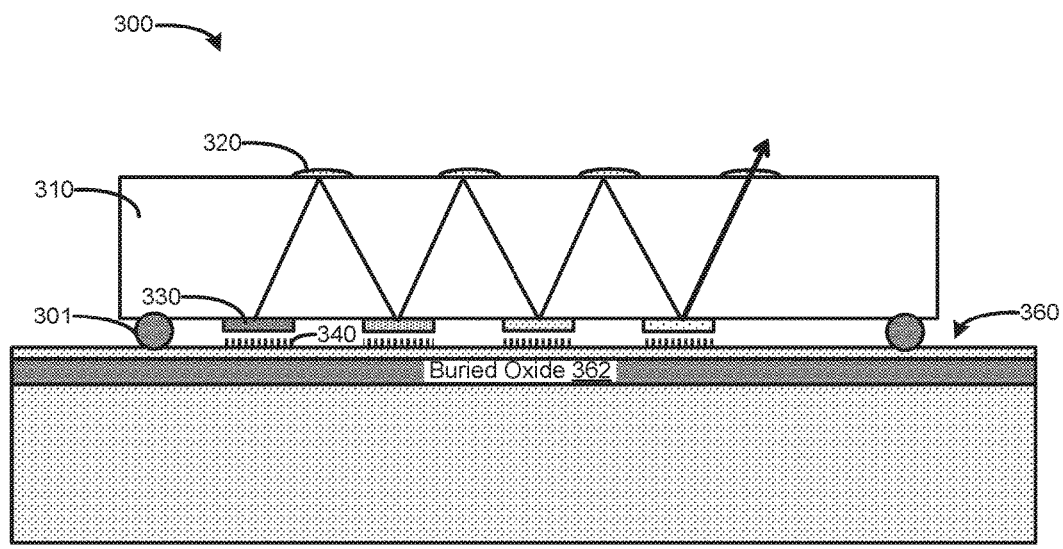
FIG. 3 is a block diagram of a device including a slab, a plurality of lenses, a plurality of filters, and a waveguide layer according to an example.

FIG. 3 is a block diagram of a device 300 including a slab 310, a plurality of lenses 320, a plurality of filters 330, and a waveguide layer 360 according to an example. The waveguide layer 360 includes gratings 340 disposed thereon. The waveguide layer 360 is disposed on a buried oxide (BOX) layer 362 of a substrate such as silicon. Lenses 320 are disposed on a first surface of the slab 310, and the filters 330 are disposed on a second surface of the slab 310. The slab 310 is flip chip solder reflowed onto the waveguide layer 360 using solder balls 301. Solder reflow enables self-alignment of slab 310 to the waveguide layer 360. Coatings may be disposed on the lenses 320 (although the coatings are not specifically illustrated in FIG. 3).

The waveguide layer 360 may be provided as a top layer of a silicon-on-insulator (SOI) substrate, above the BOX layer 362. The slab 310 may be bonded to the SOI substrate to align the mirrors 320 and filters 330 of the slab 310 with the gratings 340 of the waveguide layer 360. Accordingly, the device 300 may be based on fabricating the slab 310 as an external zig-zag cavity (with the lenses 320 and filters 330), and active-aligning the gratings 340 by maximizing an output signal at the output of the slab 310 (as indicated by the light exiting the slab 310 toward the right of the slab 310). Alternatively, passive alignment between slab 310 and gratings 340 can be achieved by solder reflow self-alignment. As illustrated, the slab 310 and substrate may be aligned and assembled onto the substrate and waveguide layer 360 based on flip-chip assembly. The solder balls 301 may then be reflowed to secure the assembly. In alternate examples, copper pillars may be used to assemble device 300, instead of and/or in addition to solder balls. The solder balls 301 may enable a gap between the slab 310 and the waveguide layer 360, to prevent direct contact between the filters 330 and the gratings 340. The gap may be filled with air, a fluid, or other coupling material to facilitate the passage of light/signals between the gratings 340 and the filters 330. The solder balls 301 may be distributed along the device 300 to provide electrical connections and mechanical support.

The gratings 340 may be fabricated from silicon or other suitable material. The gratings 340 may serve as optical couplers, enabling light from the waveguide layer 360 to be directed from any angle in the waveguide layer 360 up into the slab 310 (or vice versa, receiving light from the slab 310 down into the grating 340 in the case of a de-multiplexer). The gratings 340 may direct the light up at a particular angle out of the waveguide layer 360, to couple into the zig-zag formed by the slab 310. Thus, the slab 310 and waveguide layer 360 (and associated substrate) may be formed in a planar geometry, enabling a compact and easily manufactured device 300. The planar geometry enables the waveguide layer 360 to be coupled to light sources in planar arrangement with the waveguide layer 360, to introduce source light into the waveguide, which can be transmitted by the gratings 340 up into the slab (and vice versa in the case of a receiver device coupled to receivers in a planar arrangement, where light is received by the gratings 340 and coupled into the waveguide layer 360). The gratings 340 may be formed using a series of etched lines in a linear arrangement according to a given polarization orientation. In alternate examples, the gratings 340 may be polarization insensitive, e.g., based on circular gratings 340.

The device 300 is illustrated with a separate set of filters 330 and gratings 340. However, in alternate examples, the filters 330 or the gratings 340 may be omitted. Using both the filters 330 and gratings 340 enables high precision conformance with very tight tolerances. In applications having more relaxed tolerances, gratings alone or filters alone may be used to provide filtering as well as coupling light between the slab 310 and the waveguide layer 360.

The example device 300 based on the zig-zag arrangement provided by slab 310 assembled with the waveguide layer 360 enables high isolation of signals, and polarization and temperature insensitivity. For example, the slab 310 and the waveguide layer 360 may be formed of different materials. Thus, the fabrication benefits of silicon may be used to form the waveguide layer 360 and substrate, in contrast to the zig-zag being formed of a slab 310 of a non-silicon material that is temperature insensitive compared to silicon, thereby avoiding, in the slab 310, the temperature sensitivity issues associated with the silicon that is relatively more temperature sensitive than the slab material. Accordingly, the precise alignment of the lenses 320 and filters 330 (and/or gratings 340) disposed on the slab 310 may be maintained across a wider range of temperatures.

Figure 4:
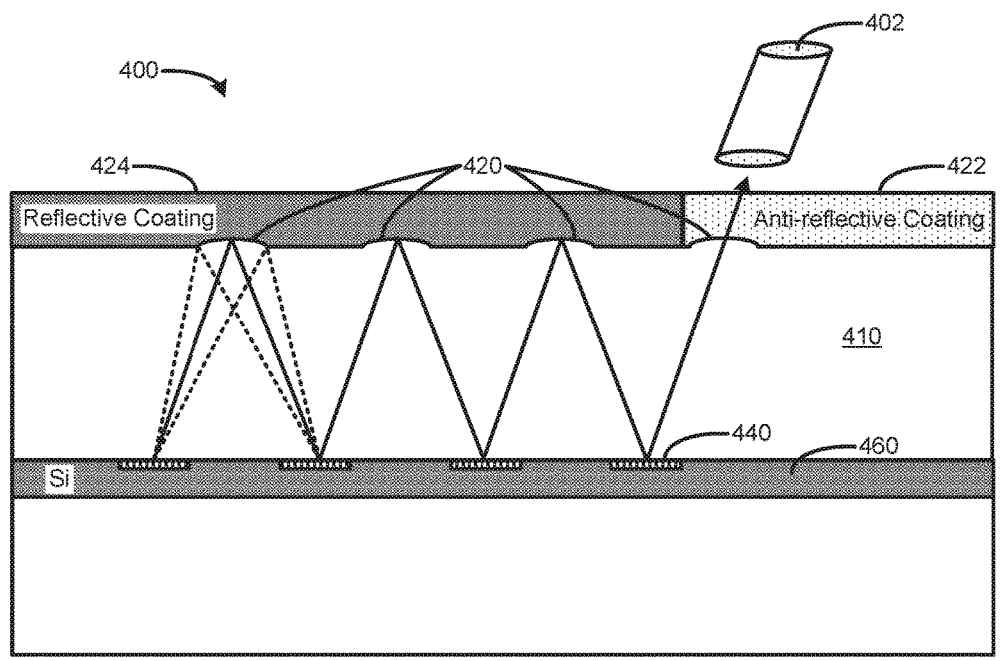
FIG. 4 is a block diagram of a device including a slab, a plurality of lenses, and a waveguide layer including a plurality of gratings according to an example.

FIG. 4 is a block diagram of a device 400 including a slab 410, a plurality of lenses 420, and a waveguide layer 460 including a plurality of gratings 440 according to an example. A portion of the lenses 420 include a reflective coating 424, and at least one lens 420 at an end of the slab 410 includes an anti-reflective coating 422 for allowing the light to pass between that lens 420 and the fiber 402.

The waveguide layer 460 is disposed on a substrate, and may be formed of, e.g., silicon or other suitable material. The substrate may be provided as a wafer, to fabricate a plurality of devices 400. The slab 410 may be monolithically grown on the substrate, e.g., as silica (SiO2), to form the zig-zag cavity. Alternatively, the SiO2 layer could also be disposed on the substrate as a second wafer that is bonded to the substrate SOI wafer. The layers of the individual wafers may be processed prior to bonding, e.g., by etching the gratings 440 into the device layer of the SOI substrate wafer, and then bonding the additional wafer on top.

As shown in device 400, separate filters and gratings are not used. Rather, the gratings 440 are formed in the waveguide layer 460 such that the gratings 440 also serve as wavelength selective filters to select desired wavelengths. In an example (e.g., in a receiver where polarization independency is desirable), the gratings 440 may be formed as round posts that are polarization independent. In alternate examples, a polarization diversity scheme may be used to separate individual polarizations, e.g., using two orthogonal linear grating couplers per desired wavelength. Thus, example devices 400 may be formed efficiently and compactly directly on a silicon substrate, including the integrated gratings 440, lenses 420, and/or coatings 422, 424. A plurality of devices 400 may be so fabricated on the wafer, which may subsequently be diced into the plurality of devices 400 for efficient manufacturing.

Figure 5:
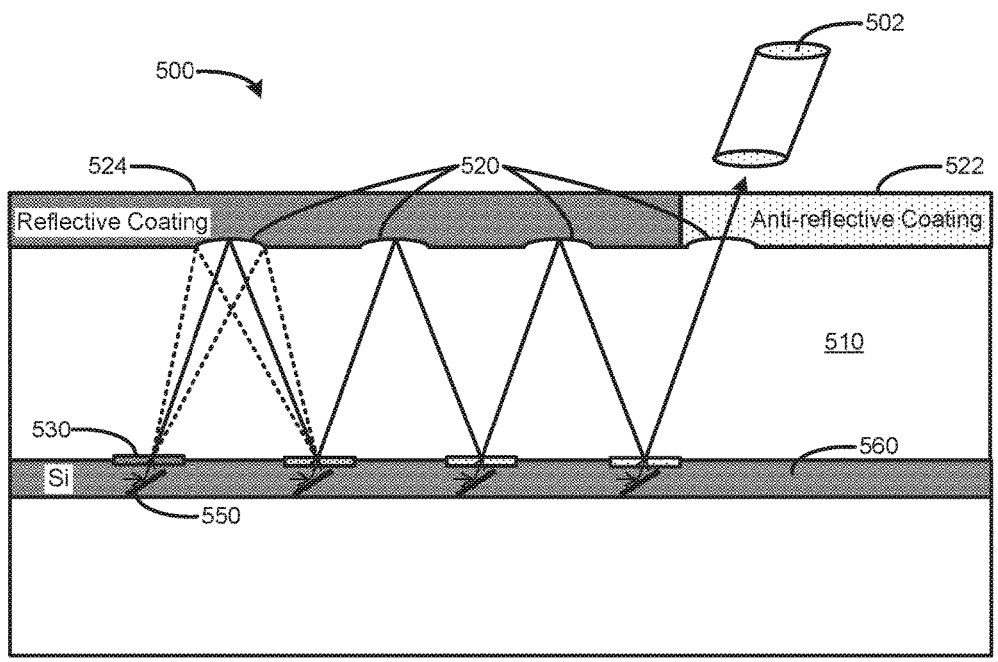
FIG. 5 is a block diagram of a device including a slab, a plurality of lenses, and a waveguide layer including a plurality of mirrors according to an example.

FIG. 5 is a block diagram of a device 500 including a slab 510, a plurality of lenses 520, and a waveguide layer 560 including a plurality of mirrors 550 according to an example. The lenses 520 include coatings 522, 524 to enable the slab 510 to operate as a zig-zag cavity in conjunction with the wavelength selective filters 530 that selectively transmit or reflect desired wavelengths of light.

The mirrors 550 may be formed according to fabrication techniques. For example, the waveguide layer 560 may be etched to an appropriate angle to turn the incoming light into the plane of the waveguide. The reflectivity of the light-turning surface can be controlled by selectively growing different layers of materials, depositing metals, or using gratings. Light passing between the slab 510 and the waveguide layer 560 may be reflected by the mirrors 550, enabling a planar geometry similar to that described with respect to FIG. 3. For example, light sources may be arranged such that light is passed through the waveguide layer 560 toward the right, and is reflected by mirrors 550 upward through the filters 530, providing the illustrated transmitting device 500 (multiplexer). Conversely, for operation as a receiver/de-multiplexer, light from the fiber 502 may enter the slab 510, pass through the filters 530, and be reflected by the mirrors 550 to pass along the plane of the waveguide layer 560 in a leftward direction as illustrated. Although the filters 530 and the mirrors 550 are illustrated as two separate elements, in alternate examples, the filters 530 may be formed on the mirrors 550 or otherwise integrated.

Figure 6:
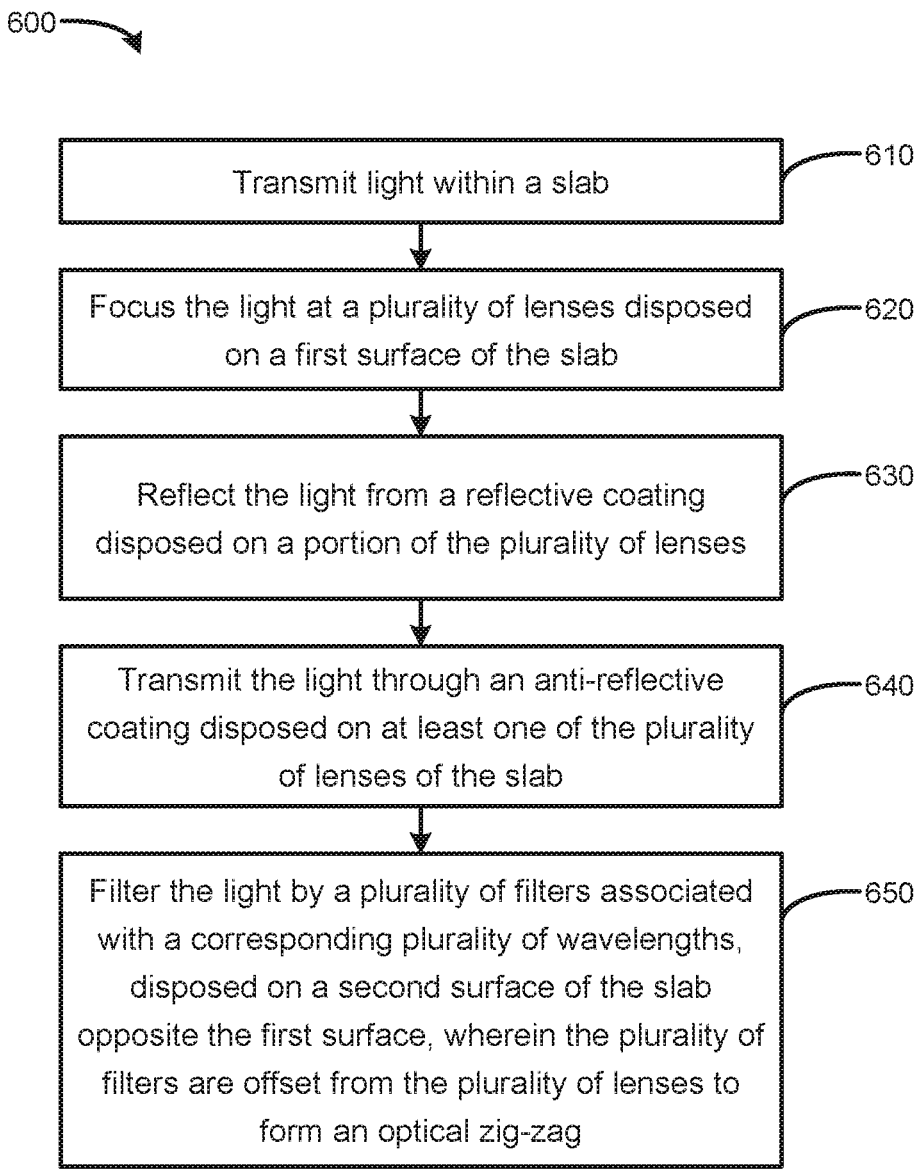
FIG. 6 is a flow chart based on transmitting light within a slab according to an example.

Referring to FIG. 6, a flow diagram is illustrated in accordance with various examples of the present disclosure. The flow diagram represents processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated (e.g., depending on whether a device is operating as a multiplexer or de-multiplexer).

FIG. 6 is a flow chart 600 based on transmitting light within a slab according to an example. In block 610, light is transmitted within a slab. For example, a slab may serve as a zig-zag cavity to allow light to reflect back and forth between a first surface of the slab and a second surface of the slab. In block 620, the light is focused by a plurality of lenses disposed on a first surface of the slab. For example, convex lenses may be formed from the first surface of the slab based on etching the first surface to shape the lenses to focus the light as it reflects from the first surface of the slab at the lenses. In block 630, the light is reflected from a reflective coating disposed on a portion of the plurality of lenses. For example, the light heading toward the first surface of the slab may pass into the lens, strike the reflective coating, and be reflected back out of the lens while being focused. In block 640, the light is transmitted through an anti-reflective coating disposed on at least one of the plurality of lenses at an end of the slab. For example, the last row of lenses (in an array of lenses) may include the anti-reflective coating to couple light between receiving and/or transmitting fiber(s). In block 650, the light is filtered by a plurality of filters associated with a corresponding plurality of wavelengths, disposed on a second surface of the slab opposite the first surface. The plurality of filters are offset from the plurality of lenses to form an optical zig-zag. For example, the light can follow a zig-zag path through the slab, passing from lens to reflector while being refocused by the lenses and selectively filtered/reflected by the filters. At a given filter, the desired wavelength corresponding to that filter may pass through the filter, while remaining wavelengths are reflected back inside the slab.

What is claimed is:

1. A device comprising:
   a slab to transmit light;
   a waveguide layer coupled to the slab in a planar arrangement substantially parallel with the slab, to perform at least one of i) directing light from the waveguide layer at a planar orientation into the slab at an angled orientation, and ii) receiving light from the slab at an angled orientation into the waveguide layer at a planar orientation;
   a plurality of lenses disposed on a first surface of the slab;
   an anti-reflective coating, disposed on at least one of the plurality of lenses of the slab to couple light through the anti-reflective coating;
   a reflective coating disposed on remaining ones of the plurality of lenses to cause the lenses to reflect light; and
   a plurality of filters associated with a corresponding plurality of wavelengths, disposed on a second surface of the slab opposite the first surface, wherein the plurality of filters are offset from the plurality of lenses to form an optical zig-zag.

2. The device of claim 1, wherein the plurality of lenses are integrally formed of a portion of the slab based on etching a portion of the first surface of the slab into the plurality of lenses.

3. The device of claim 1, wherein the waveguide layer includes a plurality of mirrors to direct the light that is to pass between the waveguide layer and the slab.

4. The device of claim 1, wherein the waveguide layer includes a plurality of grating couplers to direct the light that is to pass between the waveguide layer and the slab.

5. The device of claim 4, wherein the grating couplers of the waveguide layer serve as the plurality of filters disposed on the slab.

6. The device of claim 1, wherein the waveguide layer is aligned with and coupled to the slab based on flip-chip solder ball assembly.

7. The device of claim 1, wherein the waveguide layer is coupled to the slab based on at least one of i) the slab being monolithically grown onto the waveguide layer, and ii) the slab being bonded onto the waveguide layer.

8. The device of claim 1, wherein the slab is formed of a material that is less temperature sensitive than the waveguide layer, to avoid temperature induced changes in the slab compared to the waveguide layer.

9. The device of claim 1, wherein at least one of the plurality of filters is comprised of a thin-film filter.

10. The device of claim 1, wherein at least one of the plurality of lenses is comprised of a grating.

11. The device of claim 1, wherein the plurality of lenses are arranged as an n-dimensional array disposed on the first surface of the slab to interact with the plurality of filters to form an n-dimensional zig-zag.

12. A device comprising:
    a slab to transmit light;
    a waveguide layer coupled to the slab in a planar arrangement substantially parallel with the slab, to perform at least one of i) directing light from the waveguide layer at a planar orientation into the slab at an angled orientation, and ii) receiving light from the slab at an angled orientation into the waveguide layer at a planar orientation;
    a plurality of lenses disposed on a first surface of the slab;
    an anti-reflective coating, disposed on at least one of the plurality of lenses of the slab to couple light through the anti-reflective coating;
    a reflective coating disposed on remaining ones of the plurality of lenses to cause the lenses to reflect light; and
    a plurality of filters associated with a corresponding plurality of wavelengths, disposed on a second surface of the slab opposite the first surface to form an optical zig-zag, wherein the plurality of filters are polarization independent.

13. The device of claim 12, wherein the plurality of filters are comprised of a plurality of gratings.

14. A method comprising:
    transmitting light within a slab;
    focusing the light by a plurality of lenses disposed on a first surface of the slab;
    reflecting the light from a reflective coating disposed on a portion of the plurality of lenses;
    transmitting the light through an anti-reflective coating disposed on at least one of the plurality of lenses of the slab;
    filtering the light by a plurality of filters associated with a corresponding plurality of wavelengths, disposed on a second surface of the slab opposite the first surface, wherein the plurality of filters are offset from the plurality of lenses to form an optical zig-zag; and
    directing the light to or from the plurality of filters via a waveguide layer coupled to the slab in a planar arrangement substantially parallel with the slab.

15. The method of claim 14, wherein at least one of the plurality of lenses is comprised of a grating.

16. The method of claim 14, wherein the plurality of filters are comprised of a plurality of gratings.

17. The method of claim 14, wherein the waveguide layer is aligned with and coupled to the slab based on flip-chip solder ball assembly.

18. The device of claim 12, wherein the plurality of lenses are arranged as an n-dimensional array disposed on the first surface of the slab to interact with the plurality of filters to form an n-dimensional zig-zag.

19. The device of claim 12, wherein the waveguide layer is aligned with and coupled to the slab based on flip-chip solder ball assembly.

* * * * *